United States Patent [19]

Shimano

[11] Patent Number: 4,484,490
[45] Date of Patent: Nov. 27, 1984

[54] BRAKE OPERATING DEVICE FOR A BICYCLE

[75] Inventor: Keizo Shimano, Sakai, Japan

[73] Assignee: Shimano Industrial Company Limited, Osaka, Japan

[21] Appl. No.: 315,458

[22] Filed: Oct. 27, 1981

[30] Foreign Application Priority Data

Nov. 6, 1980 [JP] Japan .............................. 55-159258
Nov. 6, 1980 [JP] Japan .............................. 55-159259
Nov. 6, 1980 [JP] Japan .............................. 55-159260

[51] Int. Cl.³ .......................... G05G 11/00; F16C 1/10
[52] U.S. Cl. ..................................... 74/489; 74/501 R
[58] Field of Search .............................. 74/489, 501 R

[56] References Cited

U.S. PATENT DOCUMENTS 3,803,941  4/1974  Yoshikawa ............................ 74/489

FOREIGN PATENT DOCUMENTS 502132   7/1930  Fed. Rep. of Germany .
1006743  9/1957  Fed. Rep. of Germany .
1270433  6/1968  Fed. Rep. of Germany ........ 74/489
663073   8/1929  France ................................. 74/501
976261   3/1951  France ................................. 74/489
1561102  8/1975  United Kingdom .

OTHER PUBLICATIONS

The Handbook of Cycl-olgy, Seventh Edition, Copyright 1976, p. 10, part number 2039 (Rubber lever hood).

Primary Examiner—Lawrence J. Staab
Assistant Examiner—Michael J. Gonet
Attorney, Agent, or Firm—Stevens, Davis, Miller & Mosher

[57] ABSTRACT

A brake operating device for a bicycle, comprising: a fixing member comprising a bracket member, a mounting member retained thereto, and a tightening band, and an operating lever; the lever being provided with a support member which supports a retainer at one end of a control wire, the mounting member being provided with an outer stop for an outer sheath guiding the wire, so that the wire and outer sheath are drawn out from below the bracket member toward a handle bar.

7 Claims, 12 Drawing Figures

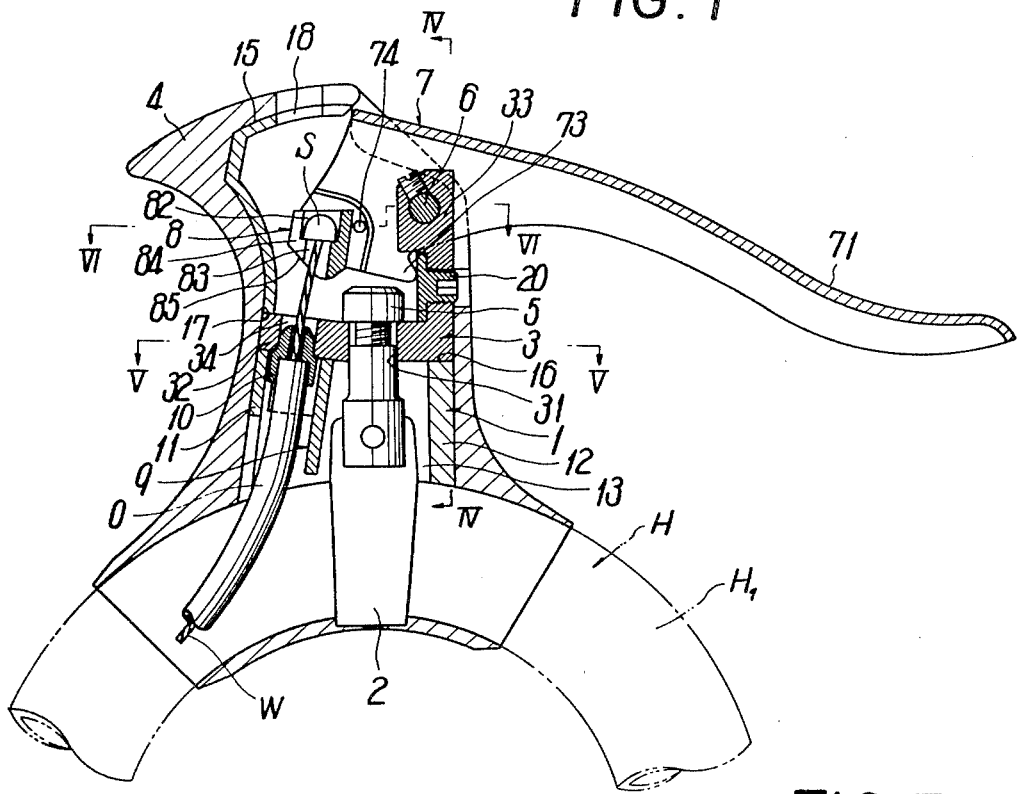
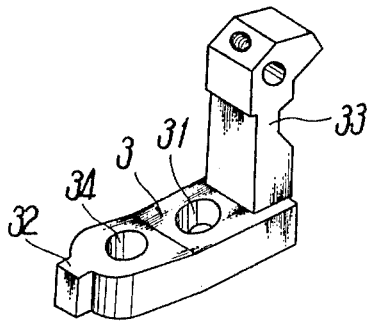

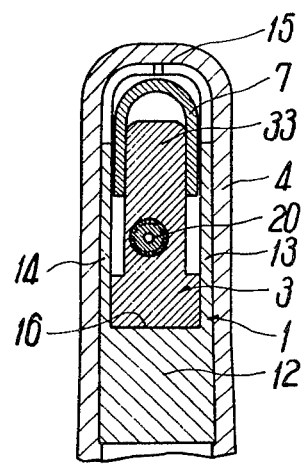
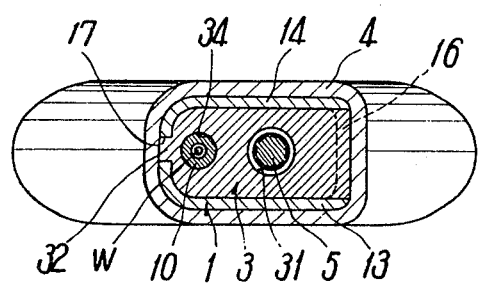
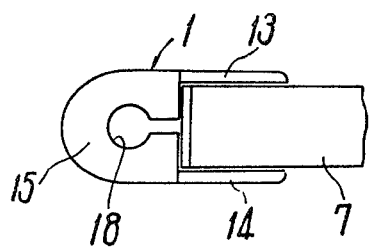
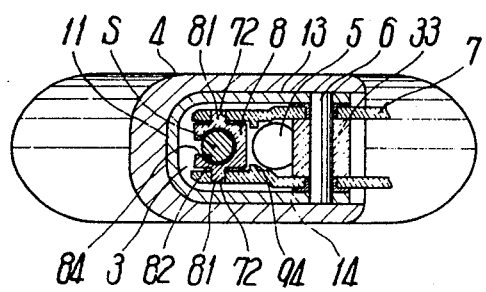
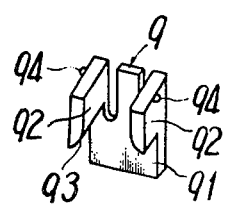
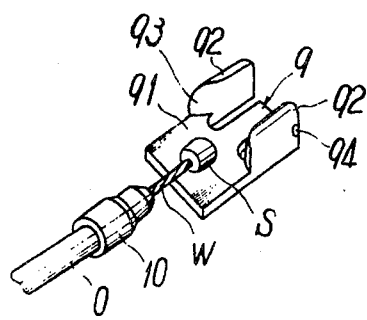
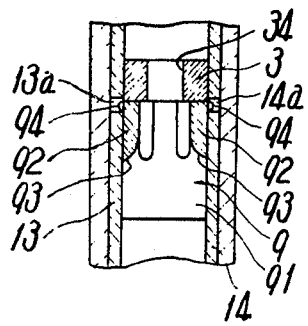

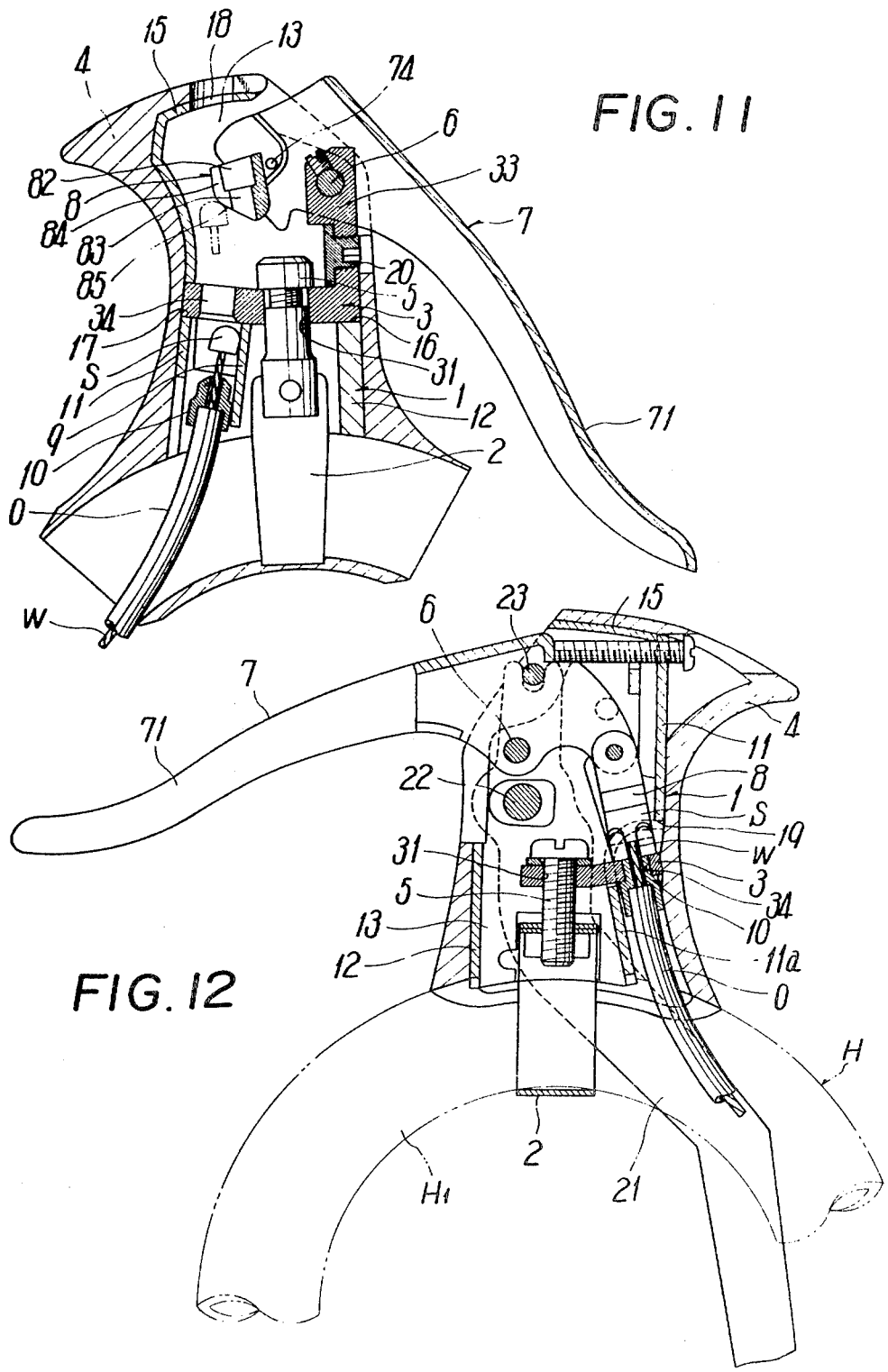

BRAKE OPERATING DEVICE FOR A BICYCLE

FIELD OF THE INVENTION

This invention relates to a brake operating device for operating a brake at a front or rear wheel of a bicycle, and more particularly to a brake operating device which is adapted to be mounted on a bent portion of a drop-type handle which has a straight portion and the bent portion.

BACKGROUND OF THE INVENTION

Generally, a brake operating device used with a drop-type handle comprises an operating lever pivoted through its lever shaft to a bracket member fixed to the handle, a retainer fixed to one end of a control wire and supported to the lever, and a through bore provided at the upper portion of a front wall at the bracket member, the through bore allowing the wire to pass therethrough and supporting an outer stop for an outer sheath guiding the wire.

In such a construction, since the control wire and outer sheath cannot be bent in a small curvature along the handle, they project unavoidably outwardly to a large degree from the handle so as to hinder a driver's operation of a bicycle.

Occasionally, the driver steers the bicycle while gripping the bracket member of the brake operating device which is mounted on the bent portion of the handle, so that the bracket member together with a cover therefor is desirably designed with an easily gripping shape, but in the conventional device, the control wire and outer sheath are drawn out from the front wall of the bracket member and the stop therefor projects from the same. As a result, a problem is created in that there is little freedom in the design of such construction.

Furthermore, if the control wire retained to the lever through the retainer is intended to be exchanged, even when the retainer is removed from the lever, it is difficult to disconnect the wire from the retainer and draw it out of the bracket member, which will take much time to exchange the wire.

SUMMARY OF THE INVENTION

In the light of the above problem, this invention has been designed. A main object of the invention is to provide a brake operating device for a bicycle, which is of simple construction to support the outer sheath and which allows the control wire and outer sheath to extend and bend naturally along the handle. Another object is to provide a brake operating device which permits an easy and quick exchange of the control wire.

In detail, the brake operating device of the invention is so constructed that a fixing member, which is fixed to the bicycle handle and which pivotally supports an operating lever through its lever shaft comprises; a box-shaped bracket member comprising a front wall, a rear wall, a pair of side walls, and an upper wall; a mounting member retained to the bracket member; and a tightening means for tightening the bracket member and mounting member to the handle; the lever being provided with a support member for retaining one end of the control wire fixed at the other end to the brake of the bicycle, the mounting member supporting a stop for the outer sheath guiding the wire, so that the control wire and outer sheath can be drawn out of the bracket member from the lower end thereof toward the handle bar.

Therefore, the wire and outer sheath can extend bending naturally along the handle without considerably outwardly projecting with respect to the handle.

Furthermore, the use of the mounting member for supporting the stop for the outer sheath needs no particular construction.

The mounting member also has a through bore which supports therein the stop for the outer sheath and is larger in diameter than a retainer attached to the terminal of the wire, so that the wire with the retainer is inserted into the bracket member from the lower side thereof, i.e., the handle side, passes through the through bore, is inserted into the support member, and is then retained thereto through the retainer. It is preferable that the mounting member is provided below the through bore, i.e., at the handle side, with a guide which guides the retainer at the wire and the stop for the outer sheath, and that at the upper wall of the bracket member opposite to the support member is provided a wire-drawing-out bore formed in a larger size than the retainer. Such construction can facilitate insertion of the wire and outer sheath into the mounting member and support member and raise the wire to push out the retainer thereof from the wire drawing-out-bore, so that the retainer is pulled to easily draw the wire out of the outer sheath, thereby performing an easy assembly of the wire and outer sheath and easy exchange of the wire.

In addition, the term "the lower portion of the bracket member" in this description means the handle side. The term "upper or lower" is used only for the convenience of the description, while is not literally defined as to the bracket member.

These and other objects of the invention will become more apparent in the detailed description and examples which follow.

BRIEF DESCRIPTION OF THE DRAWINGS

FIG. 1 is a longitudinally sectional side view of an embodiment of a brake operating device of the invention, FIG. 2 is a perspective view of a mounting member used in the FIG. 1 embodiment, FIG. 3 is a perspective view of a bracket member of the same, FIG. 4 is a sectional view taken on the line IV—IV in FIG. 1, FIG. 5 is a sectional view taken on the line V—V in FIG. 1, FIG. 6 is a sectional view taken on the line VI—VI in FIG. 1, FIG. 7 is a partially omitted plan view of the bracket member, from which a bracket cover is removed, FIG. 8 is a perspective view of a guide used in the FIG. 1 embodiment, FIG. 9 is a sectional view in part of the bracket member, showing a guide mounting portion only, FIG. 10 is a perspective view explanatory of a relation between the guide and a control wire and outer sheath, FIG. 11 is a longitudinally sectional view corresponding to FIG. 1, showing the control wire and outer sheath in condition of being inserted into the bracket member, and FIG. 12 is a longitudinally sectional view of a modified embodiment of the invention.

DETAILED DESCRIPTION OF THE INVENTION

Referring to the drawings, reference numeral 1 designates a bracket member fixed through a tightening band 2 to a U-like shaped bent portion $H_1$ of a drop tube handle H comprising two bent portions $H_1$ and a straight portion (not shown). A mounting member 3 is retained within the bracket member 1, the bracket member 1, tightening band 2 and mounting member 3, constituting a fixing member.

The bracket member 1 comprises a front wall 11, a rear wall 12, a pair of side walls 13 and 14 connecting the front and rear walls 11 and 12, and an upper wall 15, these walls 11, 12, 13, 14 and 15 being covered by a bracket cover 4 formed of a soft synthetic resin and in an easy-gripping shape. The rear wall 12 is provided at the upper portion thereof with a cutout 16, and the front wall 11 at a lengthwise intermediate portion thereof with a retaining bore 17, the cutout 16 and bore 17 retaining therein the mounting member 3.

In detail, the mounting member 3, as shown in FIGS. 1 and 2, is formed of a plate member, slanted at one end portion at the front wall 11 side toward the upper wall 15, provided at a substantially lengthwise intermediate portion with a bore 31, and fitted at the other end portion at the rear wall 12 side into the cutout 16 and at a nose at the one end into the retaining bore 17, thereby being supported to the bracket member 1. A tightening member 5 is inserted into the bore 31 and screwably tightens the band 2 onto the bent portion $H_1$, thereby fixing the bracket member 1 thereto. Also, the mounting member 3 has a rising portion 33 integral therewith, the rising portion 33 extending toward the upper wall 15 from the end of mounting member 3 at the rear wall 12 side and pivotally supporting at the upper end an operating lever 7 through a lever shaft 6.

The operating lever 7 projects its grip portion outwardly through the cutout 16 and has an extension extending ahead of the pivot portion of lever shaft 6 and toward the front wall 11, the extension pivotally supporting at the front end thereof a support member 8 which catches a retainer S attached to one end of a control wire W which is fixed at the other end to the brake at the front or rear wheel of the bicycle, so that the wire W is connected at the one end to the lever 7.

A through bore 34 is provided at a position on the inclined portion at the front wall 11 side of mounting member 3 and opposite to the support member 8, and insertably supports a stop 10 for an outer sheath O guiding the wire W, the wire W and outer sheath O being disposed along the inner surface of front wall 11 and adapted to be drawn out from the lower portion of bracket member 1 toward the handle H.

In addition, the bore 34 is larger in size than the retainer S attached to the wire W so that the retainer S can be inserted from below the bracket member 1 into the support member 8 through the bore 34.

The support member 8 is barrel-shaped and has at the outer surface a pair of stems 81 projecting therefrom at a phase difference of 180°, the stems 81 being fitted into a pair of opposite bores 72 at the lever 7, whereby the support member 8 is supported swingably thereto.

The support member 8 also is provided at the lengthwise upper portion thereof with a retaining bore 82 which receives therein and retains the retainer S, and at the lower portion with a wire insertion bore 83 smaller in diameter than the bore 82, the retaining bore 82 and wire insertion bore 83 being open radially one-sidedly through an opening 84, and at the lower end with a slope 85 which guides the retainer S of wire W sildably in the retaining bore 82.

Accordingly, the retainer S, when the wire W is inserted into the bracket member 1 from the lower side thereof, travels upwardly through the bore 34 and is guided by the slope 85 as shown in FIG. 11, thereby engaging easily with the bore 82.

On the other hand, a guide 9 is sandwiched between both the side walls 13 and 14 and below the mounting member 3 and serves to guide the retainer S at wire W and stop 10 for outer sheath O into the through bore 34 at mounting member 3.

The guide 9, as shown in FIGS. 8 to 10, comprises a plate-like-shaped body 91 and a pair of rising portions 92 extending frontward from both sides of body 91, the rising portions 92 each having at the inner surface of the lower end a guide face 93 of a circular arc in section and at the outer surface of the upper end a projecting piece 94, so that the pair of projecting pieces 94 engage with bores 13a and 14a formed at the side walls 13 and 14 respectively, thereby mounting the guide 9 on the bracket member 1.

Furthermore, the bracket member 1 is provided at the position on the upper wall 15 and opposite to the support member 8 with a through bore 18 of a key-like shape and larger in size than the retainer S and wire W so that the wire W can be exchanged easily by taking the retainer S attached to wire W, out of the bracket member 1 through the bore 18.

In addition, in the drawings, reference numeral 20 designates an adjuster screwed with the base of rising portions 33, 73 designates a stopper extending from the pivot side end of lever 7 toward the adjuster 20, and 74 designates a stopper for restricting the swinging motion of support member 8.

In the brake operating device of the invention constructed as abovementioned, the wire W and outer sheath O are inserted at one ends thereof into the bracket member 1 through the opening at the lower side thereof, i.e., at the handle H side. The retainer S attached to the end of wire W at first is guided by the guide 9 to pass through the through bore 34 at the mounting member 3 and then guided by the slope 85 to be fitted into the bore 82. Next, the outer stop 10 is guided by the guide 9 to be fitted to the bore 34, whereby the wire W and outer sheath O can extend naturally along the handle H and be mounted easily on the lever 7. The outer sheath O including the wire W, after being drawn out of the bracket member 1, is inserted into the handle H through, for example, a bore formed thereat and extends toward the brake through the handle H.

When intended to be exchanged, the wire W is removed at its brake side end from the brake and pushed at the end toward the upper wall 15 of bracket member 1, so that the retainer S disengages from the bore 82 and projects outwardly from the bracket member 1 through the bore 18, and then the wire W is pulled throughout by holding the retainer S, or is cut thereabout and pulled throughout from the brake side end, thereby being extracted from the outer sheath O.

Next, a new wire is inserted at one end thereof into the retaining bore 82 and wire insertion bore 83 at the support member 8 through the bore 18 at the upper wall 15 of bracket member 1 and then inserted into the outer sheath O through the through bore 34 and outer stop 10, and thereafter the one end of wire W projects from the brake side end of outer sheath O and is pulled out, so that the retainer S enters into the bracket member 1 through the bore 18 and engages with the retaining bore 82.

Alternatively, the mounting member 3, as shown in FIG. 12, may project at one end outwardly from the bracket member 1 and provide the through bore 34 at the projecting portion, so that the wire W and outer sheath O may extend along the outer surface of front wall 11. In this instance, the mounting member 3 is supported to opposite retaining bores at both the side walls 13 and 14 at the bracket member 1. The front wall 11 is cut out 19 and a lower portion 11a of front wall 11 retreats toward the rear wall 12, the mounting member 3 projecting at its portion including the through bore 34 outwardly from the lower portion 11a so that the wire W and outer sheath O are disposed along the outside of lower front wall 11a. In addition, referring to FIG. 12, reference numeral 21 designates an auxiliary lever mounted along the straight portion of drop type handle H, 22 designates a lever shaft of the auxiliary lever 21, and 23 designates a shaft through which the operating lever 7 operates in association with the auxiliary lever 21.

As seen from the above, the brake operating device of the invention is provided at the operating lever with the support member supporting one end of the control wire, and supports the outer stop for the outer sheath to the mounting member retained to the bracket member, so that the wire and outer sheath can be drawn out from the lower side, i.e., the handle side, of the bracket member, thereby extending naturally along the handle bar without projecting considerably outwardly.

Furthermore, the mounting member is provided with the through bore only and supports therethrough the outer stop, in other words, the mounting member is usable for supporting the stop, whereby the device is simple in construction and inexpensive to produce. Also, the retainer at the wire end can be drawn out through the bore only provided at the upper wall of bracket member, thereby enabling an easy and quick renewal of the wire.

While various embodiments of the invention have been described, they are merely exemplary of the invention and not to be constructed as limiting, the invention being defined solely by the appended claims.

What is claimed is:

1. A brake operating device for a bicycle comprising: a fixing member adapted to be fixed to a bicycle handle, said fixing member including: a mounting member; a bracket member comprising a front wall, a rear wall, a pair of side walls and an upper wall; and, a tightening means for securing said bracket member to said handle;

an operating lever pivoted to said fixing member through a lever shaft, said lever having a support member for retaining a retainer fixed at one end of a control wire, said support member including a retaining bore for receiving and retaining said retainer, a wire-insertion bore for inserting said wire which is smaller in diameter than said retaining bore, and an opening through which said retaining bore and wire insertion bore are open radially onesidedly of said support member, said mounting member being provided with a through bore permitting insertion of said wire therethrough and retaining an outer stop for an outer sheath guiding said wire, said bracket member having a guide for guiding said control wire, outer sheath and said outer stop to said through bore, said guide comprising a guide body and a pair of risings extending therefrom, each of said risings having a guide face having a circular arc cross-sectional shape, said support member being pivotally swingably supported to said lever and having a slope for guiding said retainer to said retainer bore, said support member being adapted to be pushed by said retainer to swing and thereby guide said retainer into said retainer bore whereby said outer stop is also retained at said through bore.

2. A brake operating device according to claim 1, wherein said mounting member has a rising portion extending toward the upper wall of said bracket member, said rising portion pivotally supporting said lever through said lever shaft.

3. A brake operating device according to claim 1, wherein said mounting member is formed of a plate member and has at a side of the front wall of said bracket member a portion inclined toward the upper wall of said bracket member, said inclined portion supporting said outer stop for said outer sheath.

4. A brake operating device according to claim 1, wherein the front wall of said bracket member includes a retaining bore and the rear wall of the same includes a cutout, said mounting member being retained to said retaining bore and cutout, so that said tightening means is tightened to fix said mounting member to said front and rear walls.

5. A brake operating device according to claim 1, wherein said bracket member has, at the upper wall thereof and at a position opposite to said support member, a wire-drawing-out bore larger in size than said retainer at said wire.

6. A brake operating device according to claim 1, wherein said support member has a slope for guiding said retainer at said wire to said retaining bore.

7. A brake operating device according to claim 1, wherein said bracket member has a cover which is gripshaped and covers the outer surface of said bracket member.

* * * * *